April 13, 1965   B. L. BRUCKEN ETAL   3,178,025
DRY CLEANING FILTER ADSORBENT MEANS
Filed July 18, 1962   3 Sheets-Sheet 1

INVENTORS
Byron L. Brucken
Victor A. Williamitis
BY
Frederick M. Ritchie
THEIR ATTORNEY INVENTORS
Byron L. Brucken
Victor A. Williamitis
BY
Frederick M. Ritchie
THEIR ATTORNEY April 13, 1965    B. L. BRUCKEN ETAL    3,178,025
DRY CLEANING FILTER ADSORBENT MEANS
Filed July 18, 1962    3 Sheets-Sheet 3

INVENTORS
Byron L. Brucken
Victor A. Williamitis
BY
Frederick M. Ritchie
THEIR ATTORNEY :::
United States Patent Office 3,178,025
Patented Apr. 13, 1965

3,178,025
DRY CLEANING FILTER WITH
ADSORBENT MEANS
Byron L. Brucken and Victor A. Williamitis, Dayton, Ohio, assignors to General Motors Corporation, Detroit, Mich., a corporation of Delaware
Filed July 18, 1962, Ser. No. 210,652
1 Claim. (Cl. 210—266)

This invention relates to dry cleaning apparatus and more particularly to an improved filter element for filtering and conditioning dry cleaning solvent.

The public acceptance of self-service dry cleaning apparatus has given rise to many different dry cleaning systems. One such system uses a throw-away filter cartridge which is disposed in the path of circulating solvent for removing particulate matter therefrom and for conditioning the solvent by adsorbing dyes or the like. A filter cartridge suitable for use in this growing industry must be efficient, have a long life in cycles of operation and be inexpensive to manufacture.

Accordingly, it is an object of this invention to provide an improved filter cartridge for dry cleaning solvent, such as perchloroethylene.

Another object of this invention is the provision of a solvent filter cartridge having a filter paper stage for removing particulate matter and an activated carbon stage for conditioning the solvent by eliminating dissolved contaminants from the solvent.

A further object of this invention is the provision of means for spacing adjacent zigzag folds of a paper filter element to maintain the surface area of the paper exposed for filtering, thereby to extend the life of the element.

A more specific object of this invention is the provision of a folded paper filter element having tape circumscribing the folds of the paper and thixotropic epoxy filler for securing the tape to the paper.

It is still another object of this invention to provide in a folded tubular paper filter element means for sealing the ends of the tubular element and for spacing the outer periphery of the element from a protective canister, said sealing means including a thixotropic epoxy filler.

Further objects and advantages of the present invention will be apparent from the following description, reference being had to the accompanying drawings wherein preferred embodiments of the present invention are clearly shown.

Figure 1:
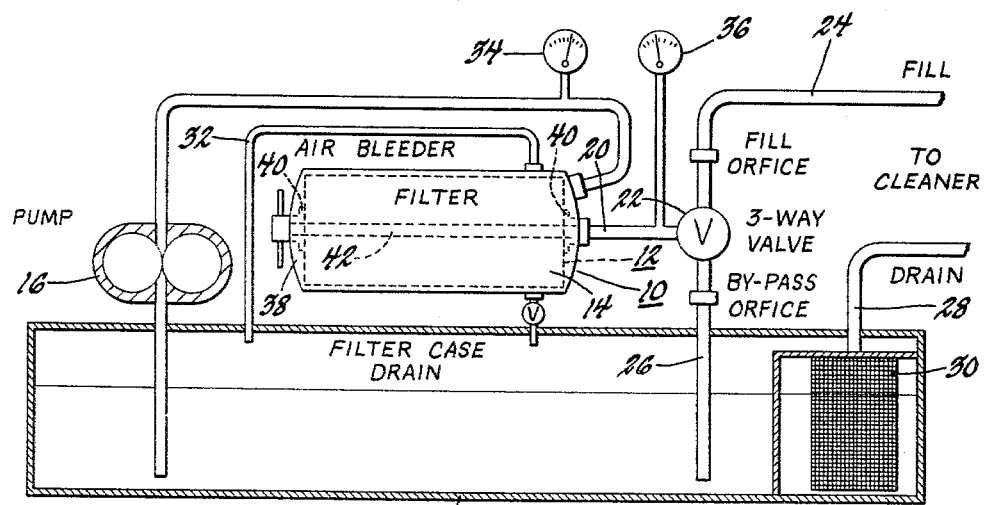
FIGURE 1 is a solvent circulating system for dry cleaning which is suitable for use with the filter cartridge of this invention.

In accordance with this invention and with reference to FIGURE 1, a circulating solvent system is shown to include a filter 10 having a filter cartridge 12 and a filter cartridge container 14. The container 14 is adapted to receive solvent from a pump 16 which has its inlet connected to a solvent sump 18. The filter cartridge 12 filters and conditions the solvent flowing from the filter container 14 by way of the outlet conduit 20. This filtered and conditioned solvent may then be directed by a three-way valve 22 either to the fill nozzle of a dry cleaner through a conduit 24 or to the sump by way of the by-pass conduit 26. Solvent is returned to the sump from the dry cleaner by way of a drain line 28 and a button trap 30. To prevent air traps in the filter container 14 an air bleeder line 32 may be included. A pressure gage 34 on the inlet side of the filter container 14 and a pressure gage 36 on the outlet side of the filter container indicate pressure differential across the filter container as a measure of the soiled or plugged condition of the filter cartridge 12. The filter container 14 has a removable cover 38 which may be opened for taking out the soiled cartridge 12 and for replacing it with a fresh cartridge. Within the container 14 there are suitable seal means 40 for insuring that the solvent flow will be radially inwardly through the cartridge 12 and dispensed axially from a center passage 42 in the cartridge to the outlet line 20. This invention is directed to an improved filter cartridge 12 for use with this solvent circulating system.

Figure 3:
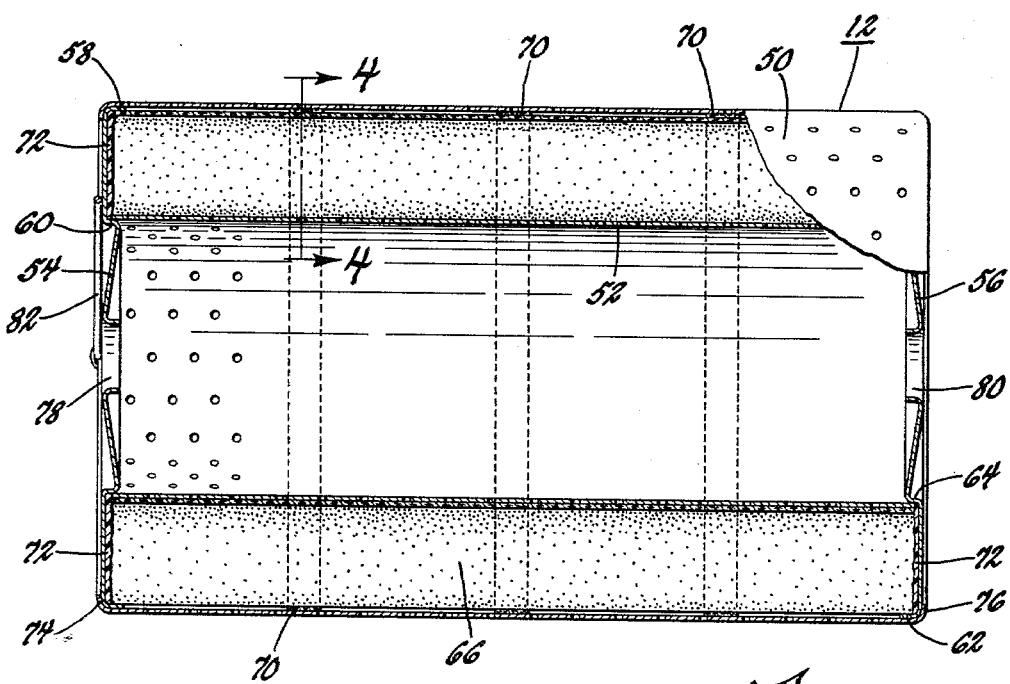
FIGURE 3 is a side sectional view of the filter cartridge taken along line 3—3 of FIGURE 2.
Figure 2:
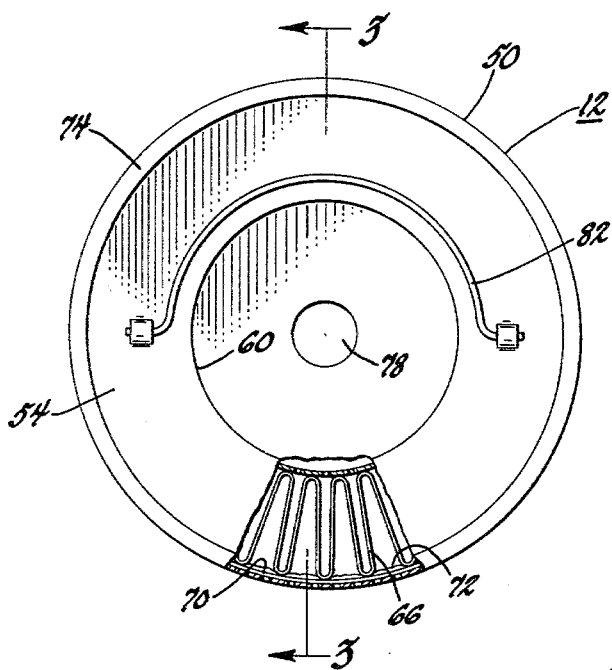
FIGURE 2 is a top elevational view of this invention with parts broken away to show the folded paper filter element.

Turning now to FIGURE 3, the filter cartridge 12 is shown comprised of a perforated outer shell 50, a perforated support tube 52 and a pair of end plates 54, 56 for retaining the outer shell and support tube in spaced relationship. More specifically, the end plate 54 includes an outer peripheral flange 58 and an inner peripheral flange 60, the latter being secured to the support tube 52. At the other end of the cartridge, the end plate 56 has an outer peripheral flange 62 connected to the outer shell 50 and an inner peripheral flange 64 against which the center support tube 52 abuts.

Sandwiched between the concentrically arranged outer shell 50 and support tube 52 is a tubular paper element 66 comprised of approximately 38 square feet of filter paper folded into approximately 108 folds. With the support tube 52 and paper element 66 assembled in nested relationship, the end caps 54 and 56 are cemented to the opposite ends of the assembly. For this purpose, Moran thixotropic epoxy filler in the proportions of 109–C–142 CP No. 1 (2 parts) and 109–C–142 CP No. 2 (1 part) or equivalent is suitable with approximately two ounces of the cement being used in the annular channel of each end plate.

Figure 4:
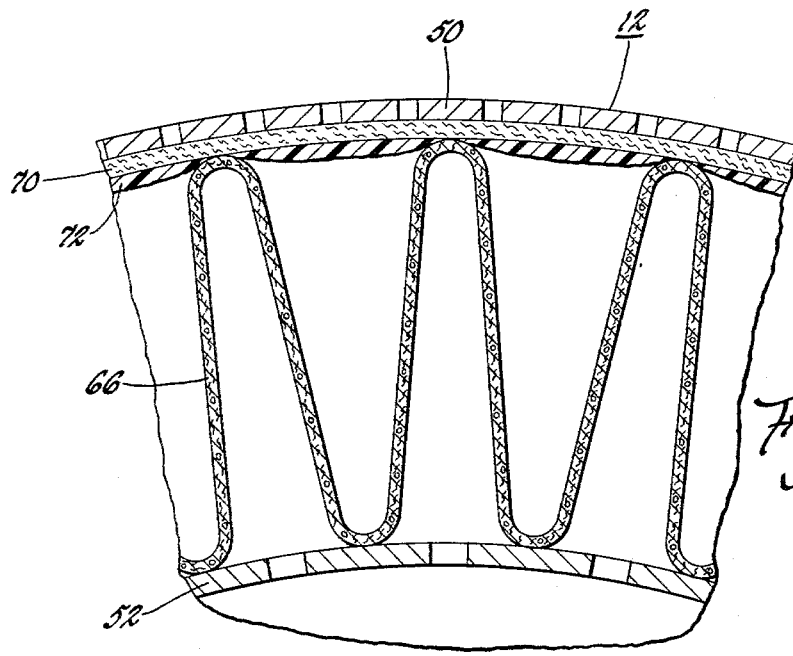
FIGURE 4 is an enlarged fragmentary sectional view taken along line 4—4 in FIGURE 3 to show the means for spacing the folds of the paper element.

In accordance with this invention, it is desirable that the folds of the paper element 66 be uniformly spaced in order that the maximum paper surface area is exposed and available during the life of the cartridge. Further, it is desirable to extend the life of the cartridge by adding wear resistance at the outer edge of the paper folds to prevent their being rubbed by surrounding cartridge structure, such as the outer shell 50. To effect this spacing of the paper folds from each other and from the outer shell 50, three tapes 70 are wrapped or banded around the outer periphery of the paper element 66 and cemented to the filter with suitable thixotropic epoxy such as Moran thixotropic epoxy filler 109–C–142 CP No. 1 (2 parts) 109–C–142 CP No. 2 (1 part) or equivalent using one ounce total for the three tapes 70. With reference to FIGURE 4, it can be seen that the epoxy flows into the space between adjacent folds of the paper element. Thus, the cement 72 and the tape 70 combine to space the paper folds while the tape 70 spaces the outer tips of the paper element from the outer shell 50.

The cartridge 12 is completed when the outer shell 50 is slipped over the filter element assembly (cylinder 52, paper element 66 and end plates 54, 56) and the ends of this outer shell are spun over to form annular retaining flanges 74 and 76. Since dry cleaning solvent, such as perchloroethylene, needs to be conditioned to remove dyes as well as filtered to remove particulates, the paper element 66 may be formed of carbon impregnated paper such as taught in our copending application Serial No. 175,901, filed February 26, 1962.

Note that both end plates 54 and 56 are formed with center port collars 78 and 80. The port 78 is sealed at the one end of the filter container 14 to prevent ingress of solvent therethrough while the other port 80 aligns with the outlet conduit 20 (FIGURE 1). For handling ease, a bail or handle 82 may be spot welded on one of the end plates.

Figure 5:
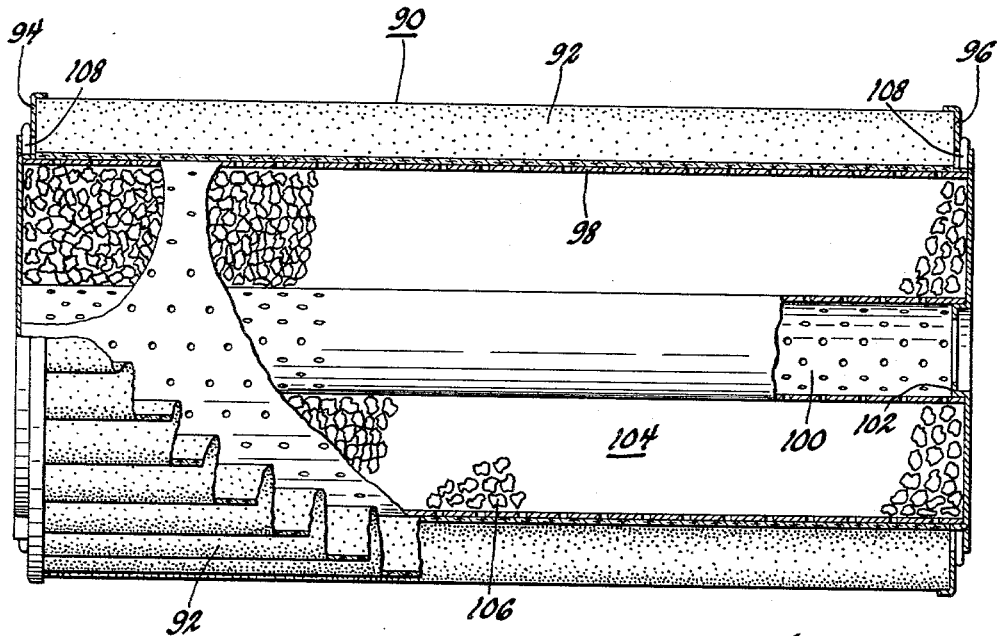
FIGURE 5 is a side sectional view taken along line 5—5 in FIGURE 6 partly in elevation and with parts broken away to show another embodiment of the filter cartridge of this invention.
Figure 6:
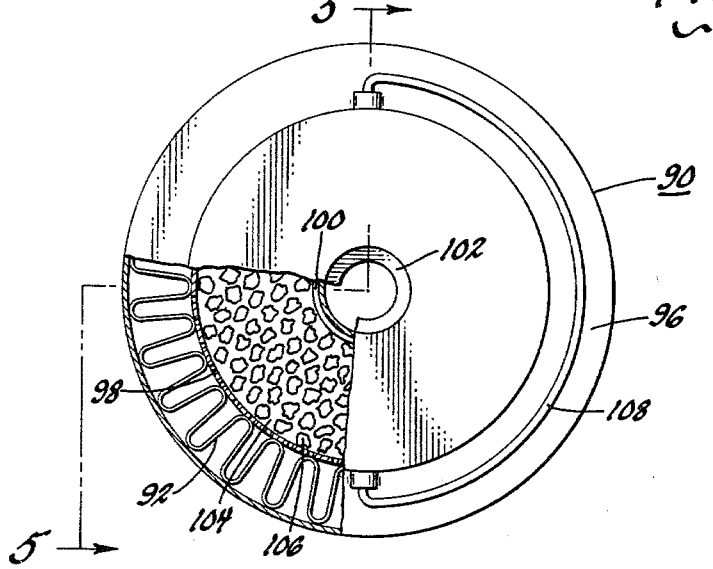
FIGURE 6 is a top elevational view with parts broken away of the filter cartridge of FIGURE 5.

Turning now to FIGURES 5 and 6, another embodiment of this invention will be described. In the filter cartridge 90 the folded paper element 92 is held between end plates 94 and 96 and supported on a perforated cylindrical support tube 98. A center tube 100 is perforated and joined to a ported boss 102 in the end plate 96 and a similar boss in the end plate 94. Thus the center tube 100 forms with the support tube 98 a solvent conditioning chamber 104. The chamber 104 is filled with an activated carbon matrix of granules 106 which is somewhat like a porous thick-walled tube. With the center tube 100, support tube 98, paper element 92 and carbon matrix 106 in position, the end caps 94 and 96 are cemented to the ends of the assembly to complete the filter cartridge 90. Again, thixotropic epoxy cement is used to adhere the end plates to the ends of the cartridge. Moreover, it is obviously within the skill of the art to incorporate the perforated outer shell and paper fold spacers of FIGURE 3 in the two chambered filter cartridge embodiment of FIGURE 5.

The paper element 92 may be made from 10 micron-pleated phenolic resin impregnated cellulose fiber sheet to form the filtering stage of the cartridge 90. When the cartridge 90 is installed in the filter container 14, solvent flow will be radially inwardly from the outer periphery of the cartridge and will be dispensed axially through the port in the boss 102. Particulate matter will be removed in the first paper stage 92 while the solvent will be conditioned with the removal of dyes and the like while it passes through the carbon stage 106. A bail 108 may be installed on the end plate 94 for handling the cartridge while it is being installed and removed from the filter container.

It should now be seen that an improved filter cartridge has been provided for dry cleaning systems which has a long life and is easily manufactured. Further, the cartridge includes means for spacing the folds of the paper element from each other and from the protective canister of the cartridge itself.

While the embodiments of the present invention as herein disclosed constitute preferred forms, it is to be understood that other forms might be adopted.

What is claimed is as follows:

A disposable cartridge for use with dry cleaning solvent comprising a perforated outer shell adapted to receive solvent to be filtered and conditioned, a perforated support tube inside said outer shell and concentric therewith, a pervious outlet tube disposed concentrically with the support tube, end plate means at each end of said cartridge having a first portion connecting said outer shell and said support tube in spaced relationship respectively along the outer and inner peripheral edges thereof to define a solvent filtering chamber, each of said end plate means having a second portion connected to the inner peripheral edge of said first portion and the pervious outlet tube and defining a center cavity, at least one of said end plate means having solvent outlet means in communication with the interior of the outlet tube, a tube of longitudinally folded filter paper in said filtering chamber for removing particulate matter from solvent flowing therethrough, means for sealing the ends of said filter paper tube to said end plate means respectively, carbon granules in said center cavity for removing soluble matter from solvent flowing therethrough, and spacing means adhesively bonded with the outer fold edges only of said filter paper for uniformly spacing adjacent folds of said filter paper from each other and extending from said outer fold edges into non-bonded engagement with said outer shell to space said tube of filter paper from said outer shell to prevent the rubbing of said outer fold edges by said outer shell.

References Cited by the Examiner

UNITED STATES PATENTS

| | | | |
|---|---|---|---|
| 328,947 | 10/85 | Johnson | 210—502 |
| 2,087,775 | 7/37 | Matthews | 210—167 X |
| 2,759,610 | 8/56 | James | 210—493 |
| 2,988,227 | 6/61 | Harms | 210—493 |
| 3,054,507 | 9/62 | Humbert et al. | 210—493 |

FOREIGN PATENTS

| | | |
|---|---|---|
| 566,327 | 11/58 | Canada. |
| 1,177,351 | 12/58 | France. |
| 766,286 | 1/57 | Great Britain. |

REUBEN FRIEDMAN, *Primary Examiner.*

HERBERT L. MARTIN, *Examiner.*